US012773698B2

(12) United States Patent
Artz et al.

(10) Patent No.: US 12,773,698 B2
(45) Date of Patent: Oct. 27, 2026

(54) STUD INSTALLATION

(71) Applicant: Weir Minerals Netherlands B.V., Venlo (NL)

(72) Inventors: Sander Artz, Gennep (NL); Dennis Geutjes, Velden (NL); Bram Steijn, Velden (NL)

(73) Assignee: WEIR MINERALS NETHERLANDS, B.V. (NL)

(*) Notice: Subject to any disclaimer, the term of this patent is extended or adjusted under 35 U.S.C. 154(b) by 78 days.

(21) Appl. No.: 18/851,545

(22) PCT Filed: Apr. 3, 2023

(86) PCT No.: PCT/IB2023/053353
§ 371 (c)(1),
(2) Date: Sep. 26, 2024

(87) PCT Pub. No.: WO2023/199164
PCT Pub. Date: Oct. 19, 2023

(65) Prior Publication Data

US 2025/0249461 A1 Aug. 7, 2025

(30) Foreign Application Priority Data

Apr. 14, 2022 (GB) ..................................... 2205609

(51) Int. Cl.
*B02C 4/30* (2006.01)

(52) U.S. Cl.
CPC .......... *B02C 4/305* (2013.01); *B02C 2210/02* (2013.01)

(58) Field of Classification Search
CPC ....... B02C 2210/02; B02C 4/305; B02C 4/02; B02C 4/08; B02C 4/30
See application file for complete search history.

(56) References Cited

U.S. PATENT DOCUMENTS 4,662,556 A 5/1987 Gidlund
6,523,767 B1 * 2/2003 Ramesohl .............. B02C 4/305 241/293
9,216,555 B2 * 12/2015 Madok .................... B02C 4/305
2011/0239448 A1 10/2011 Sarh

FOREIGN PATENT DOCUMENTS

CN 104148140 A 11/2014
CN 207757554 U 8/2018
WO 2013181717 A1 12/2013
WO 2014124491 A1 8/2014
WO 2021042221 A1 3/2021

OTHER PUBLICATIONS

Machine translation of CN 208727615 U (Year: 2019).*

* cited by examiner

*Primary Examiner* — Vishal I Patel
(74) *Attorney, Agent, or Firm* — Morriss O'Bryant Compagni Cannon, PLLC

(57) ABSTRACT

A method and machine (10) for stud installation are described. The machine comprises: a support arrangement (20) configured to support a tyre (14) and a shaft (12) on which the tyre is mounted for angular displacement about a longitudinal axis of rotation, and a stud insertion arrangement (22), at least part of which is displaceable relative to a tyre supported on the support arrangement, and which is configured to insert studs into holes in the tyre.

12 Claims, 11 Drawing Sheets

STUD INSTALLATION

FIELD OF INVENTION

This invention relates to installing studs on a high pressure grinding roll (HPGR); more particularly, installing studs on a tyre of an HPGR.

BACKGROUND OF THE INVENTION

An HPGR comprises a pair of rollers which are counter-rotated, and which grind ore fed in the gap between the rollers. The roller surface experiences very large pressures, so it is common for tungsten carbide studs to be provided on the roller surface, protruding radially therefrom.

In typical HPGRs, the roller surface is provided by a hollow cylindrical steel tyre that has a plurality of spaced apertures (or holes) into which high wear material studs (typically made from tungsten carbide) are partially inserted during manufacture of the roller, such that an outer portion of each stud protrudes radially beyond the outer surface of the tyre.

The studs are retained in their respective holes adhesively. However, it is important that an operatively inner or root end of each stud is in direct contact with the material of the tyre forming the inner or blind end of the associated hole. This ensures that a load applied to a stud during operation is transmitted directly from the stud to the tyre and the adhesive serves primarily to retain the stud in the hole. If there is a gap between the root end of the stud and the inner end of the hole then loads applied to the stud are transmitted to the tyre through the adhesive interface between the stud and the tyre. This can result in failure of the adhesive interface and loosening or even falling out of the stud.

Currently, each stud is manually installed in its associated hole. The installation procedure involves the installer introducing an adhesive into a hole in the tyre. After the adhesive is introduced, the installer inserts a stud into the hole. A drill mounted tool is then used to engage the operatively outer end of the stud and urge the stud into the hole and at the same time to rotate the stud. This ensures that the entire surface of the stud located in the hole is coated with adhesive. In addition, it permits air trapped in the hole to escape together with excess adhesive. As mentioned above, it is important that the stud is fully inserted into the hole. One way in which the installation of the stud is checked is by striking the stud, after installation, with a plastic hammer. The sound which is emitted differs when the stud is fully inserted and when it is not fully inserted. Another way in which the insertion of the stud is checked is by checking the extent to which the stud protrudes from the outer surface of the tyre, e.g., using a straight strip. The studs should all protrude from the surface of the tyre by approximately the same distance and if this is not the case it may be necessary to remove the stud and check that it is within specification.

Each roller has a large number of studs, typically of the order of 15,000 (depending on the size of the roller), and accordingly, the installation of the studs is extremely time consuming and is prone to human error. For example, the quantity of adhesive which is applied may vary from hole to hole. In addition, in view of the tedious nature of the job, it is easy for an installer to lose concentration and not install one or more studs properly. It is extremely difficult to check after the installation of the studs whether any have been installed incorrectly.

It is an object of an embodiment of this invention to ameliorate this problem or provide a useful alternative.

SUMMARY OF THE INVENTION

This summary is provided to introduce a selection of concepts that are further described in the detailed description below. This summary is not intended to identify indispensable features of the claimed subject matter, nor is it intended for use as an aid in limiting the scope of the claimed subject matter.

In this application relative terms are used, such as front, rear, up, down, etc., only for ease of the description and understanding of the embodiments, not by way of limitation. Ordinal numbers (first, second, third, etc.) are assigned arbitrarily herein, and are used to differentiate between parts, and do not indicate a particular order, sequence or importance.

According to a first aspect of the invention there is provided a stud installation machine for installing studs in a tyre of an HPGR, which machine includes: a support arrangement configured to support a tyre and a shaft on which the tyre is mounted for angular displacement about a longitudinal axis of rotation; and a stud insertion arrangement, at least part of which is displaceable relative to a tyre supported on the support arrangement, and which is configured to insert studs into respective holes in the tyre.

The machine may include an adhesive dispensing arrangement, at least part of which is displaceable relative to a tyre supported on the support arrangement, and which is configured to dispense adhesive into holes in the tyre before studs are inserted into the holes. The adhesive dispensing arrangement may include a dispensing head which is insertable into a hole in the tyre and to dispense adhesive onto the surface of the tyre defining the hole. In particular, the adhesive dispensing arrangement may include a control unit, adhesive storage tank, metering valve and rotary spray, and may be based on components available from: Ecolab Engineering GmbH, of Raiffeisenstraße 7, 83313 Siegsdorf, Germany. These components may include a Multiline 1000 (trade mark) control unit (https://www.ecolab-engineering.de/en/home/).

The stud insertion arrangement may include a feed arrangement configured to feed a stud from a supply of studs into an insertion position in which the stud is radially spaced from and aligned with a radially extending stud receiving hole in a tyre of the roller into which the stud is to be inserted, and a stud displacement mechanism configured to displace the stud from the insertion position to insert at least an operatively inner end portion of the stud into the associated hole. The stud displacement mechanism may include an actuator which is displaceable between a retracted condition in which a stud is receivable in the insertion position and an extended condition, displacement of the actuator from its retracted condition to its extended condition displacing the stud from the insertion position into the hole in the tyre. The actuator may be a linear actuator and displacement of the actuator between its extended and retracted conditions may be effected by a pressurised fluid, e.g., hydraulically or pneumatically.

The machine may include an indexing arrangement configured to align the at least part of the adhesive dispensing arrangement and the at least part of the stud insertion arrangement with holes in the tyre to ensure accurate dispensing of the adhesive and placement of the studs.

The indexing arrangement may include a sensor which is configured to sense the position of a hole in the tyre and, in necessary adjust the position of the stud displacement mechanism to align it with the hole in the tyre into which a stud is to be displaced. The sensor may include a probe which has a tapered leading end which is insertable into a hole in the tyre and a detector arrangement for detecting lateral loading and/or displacement of the probe which would be indicative of a misalignment of the probe and hence the stud displacement mechanism relative to the holes in the tyre. The displacement mechanism, adhesive dispensing head and the probe may be laterally spaced, the spacing between which corresponds to the lateral spacing or pitch spacing of the holes in a row of holes in the tyre. Hence, in use, when the probe is inserted into a hole in a row of holes, if it is aligned with the hole there will be no lateral displacement of the probe and, by virtue of their lateral spacing relative to the probe, the displacement mechanism and the adhesive dispensing head will be aligned with other holes in the row of holes. If, however, the probe is not aligned with a hole, as it is inserted, by virtue of its tapered leading end, it will be deflected. The position of the displacement mechanism and the adhesive dispensing head will be adjusted in response to the direction and extent of the deflection of the probe to bring them into alignment with respective holes in the tyre.

The pitch spacing of the holes on different tyres may vary. Accordingly, the lateral spacing between the displacement mechanism, adhesive dispensing head and the probe may be adjustable to suit the particular hole spacing of a tyre, thereby enabling the machine to be used to install studs in tyres of different sizes and having differing spacing between the holes.

The machine may include a tool support module on which at least part of the stud insertion arrangement, adhesive dispensing arrangement and indexing arrangement are mounted and a gantry on which the tool support module is mounted and which is configured to permit displacement of the tool support module relative to a tyre supported on the support arrangement. More particularly, the gantry may be configured to permit displacement of the tool support module at least one of longitudinally, parallel with the axis of rotation, vertically, and transversely relative to the axis of rotation. In a preferred embodiment, the gantry may be configured to permit displacement of the tool support module along mutually perpendicular X, Y and Z axes.

The gantry may include a carriage which is displaceable along a first horizontal displacement path which is parallel with the axis of rotation. The machine may include a base track on which the carriage is displaceably mounted.

The gantry may include an intermediate support which is mounted on the carriage and is displaceable relative to the carriage in a second horizontal displacement path which is perpendicular to the first horizontal displacement path.

The gantry may include an upright support which is mounted on and extends upwardly from the intermediate support and on which the tool support module is mounted. The position of the tool support module on the upright support may be adjustable along a vertical displacement path. This arrangement permits displacement of the tool support module in three-dimensions, i.e., along X, Y and Z axes relative to a tyre mounted on the support arrangement.

The support arrangement may include a first pair of rollers and a second pair of rollers which are spaced longitudinally from the first pair of rollers, the rollers being rotatable about axes of rotation which are parallel with the longitudinal axis of rotation, and which are configured to support the shaft on which the tyre is mounted rotatably thereon for rotation about the longitudinal axis. The machine may include a drive arrangement for driving at least one of the rollers to rotate the shaft and hence the tyre supported on the rollers. In a preferred embodiment of the invention, the drive arrangement may be configured to drive both rollers in at least one of the first and second pairs of rollers. The drive arrangement may include a motor drivingly connected to the or each roller.

The position of one or more of the rollers may be adjustable to permit the shafts and tyres of the rollers of different sized HPGRs to be supported thereon and to permit adjustment of the rollers to ensure that the longitudinal axis of rotation extends horizontally.

According to a second aspect of the invention there is provided a method of installing studs on a roller of an HPGR which comprise the steps of: feeding a stud from a supply of studs into an insertion position in which the stud is radially spaced from and aligned with a radially extending stud receiving hole in a tyre of the roller; and displacing the stud by means of a stud displacement mechanism to insert at least an operatively inner end portion of the stud into the associated hole.

The method may include the step of applying adhesive in the hole before the step of feeding the stud.

Each stud may have an operatively inner end which is inserted into the hole in the tyre and an operatively outer end which is intended to protrude from a radially outer surface of the tyre once the stud has been installed.

Optionally, the method includes, prior to inserting a stud, detecting if the stud is in the correct orientation such that when positioned in the insertion position the operatively inner end of the stud is facing the hole in the tyre into which the stud is to be inserted. If the stud is in the incorrect orientation, the method may include returning the stud to the supply of studs and feeding another stud from the supply of studs to the insertion position.

Optionally, applying adhesive to the hole includes inserting an adhesive dispensing head into the hole and discharging adhesive from the dispensing head onto the surface of the tyre defining the hole.

Optionally, after a stud has been installed, the method includes displacing the stud displacement mechanism laterally so that it is in registration with an adjacent hole in a row of holes in the tyre to permit a stud to be inserted into the adjacent hole.

Once studs have been inserted into all of the holes in a row of holes in the tyre, the method optionally includes rotating the tyre about a longitudinal axis of rotation so as to bring another row of holes into registration with the stud displacement mechanism to permit the insertion of studs into another row of holes.

Optionally, the method includes aligning the displacement mechanism with a hole into which a stud is to be inserted prior to displacing the stud into the hole.

These and other aspects of the invention will now be described, by way of example, with reference to the accompanying diagrammatic drawings, in which:

DETAILED DESCRIPTION OF EMBODIMENTS

Figure 2:
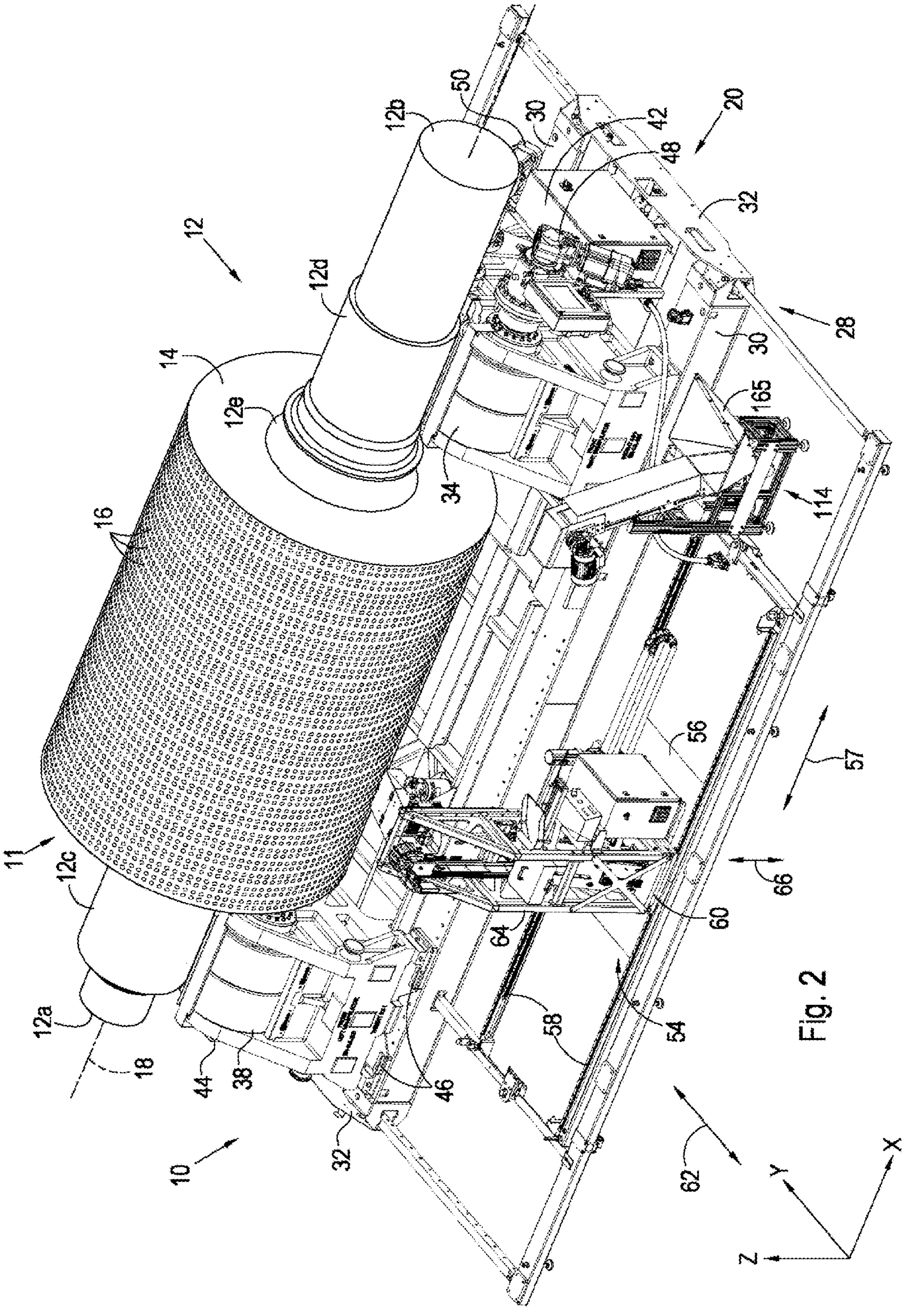
FIG. 2 shows a three-dimensional view of the machine of FIG. 1 with a shaft and tyre of an HPGR mounted on the machine.
Figure 3:
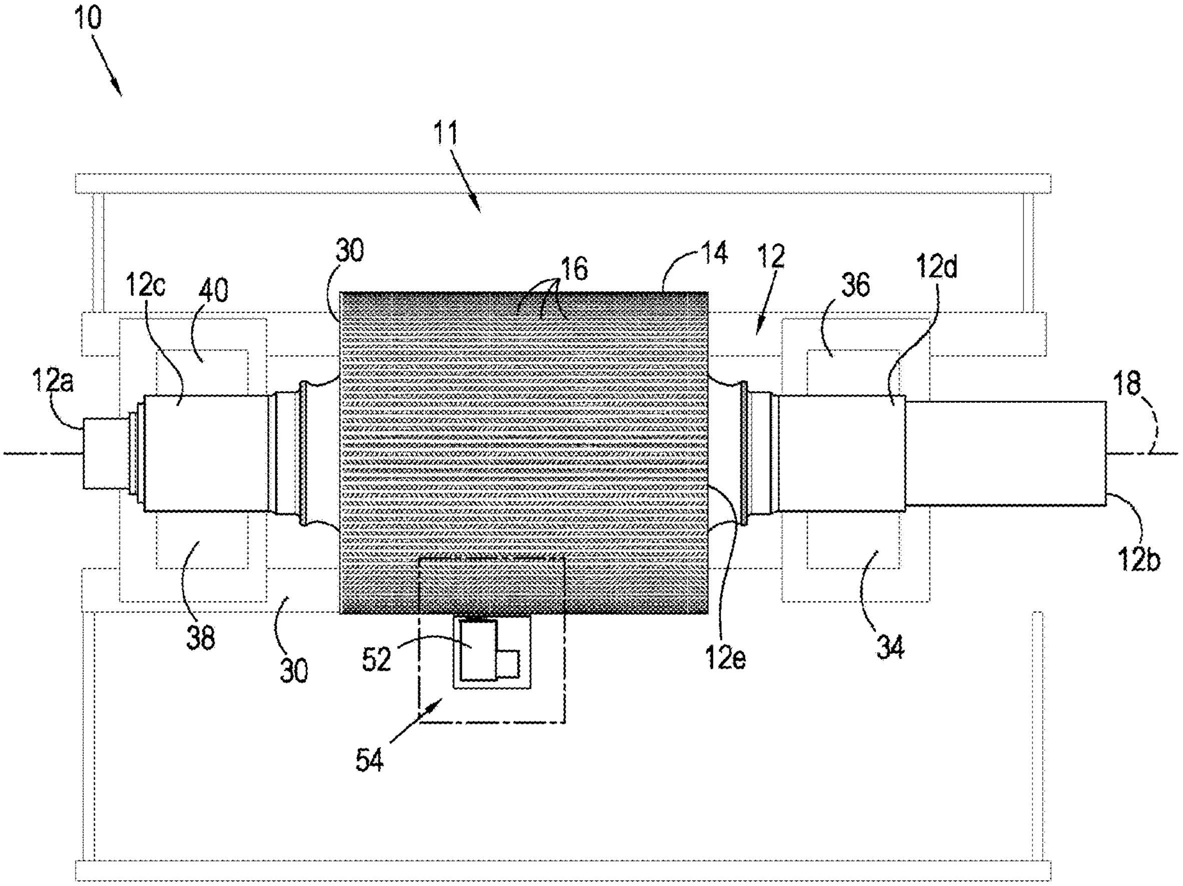
FIG. 3 shows a schematic plan view of the machine of FIG. 2.
Figure 4:
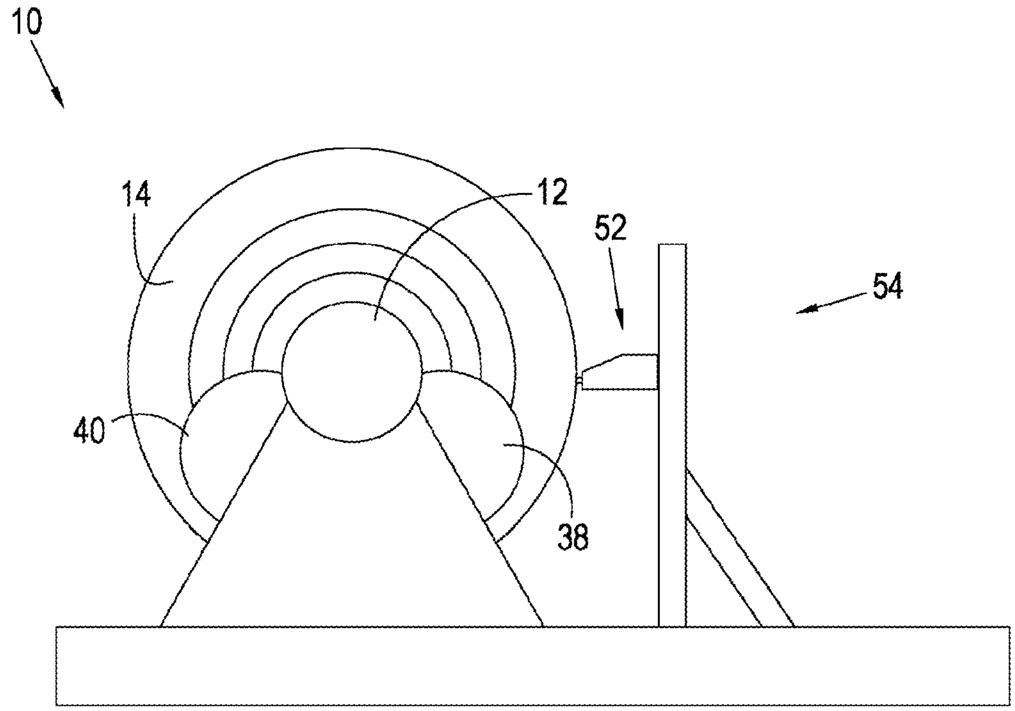
FIG. 4 shows schematically an end view of the machine of FIG. 2.

In the drawings, reference numeral 10 refers generally to a stud installation machine for installing studs in a tyre of an HPGR in accordance with an embodiment of the invention. As illustrated in FIG. 2, the HPGR roller 11 with which the machine 10 is intended for use typically comprises an elongate shaft 12 and a hollow, cylindrical tyre 14 mounted on the shaft 12 as an interference fit.

The shaft 12 extends from a driven end 12*a* to a mounting end 12*b* and defines a bearing mounting portion 12*c*, 12*d* near each end 12*a*, 12*b* and a frusto-conical tyre mounting section 12*e* located between, and protruding radially from, the bearing mounting portions 12*c*, 12*d* of the shaft 12. In other embodiments, the tyre mounting section 12*e* may be cylindrical (i.e. having a uniform, circular cross-section).

Figure 8:
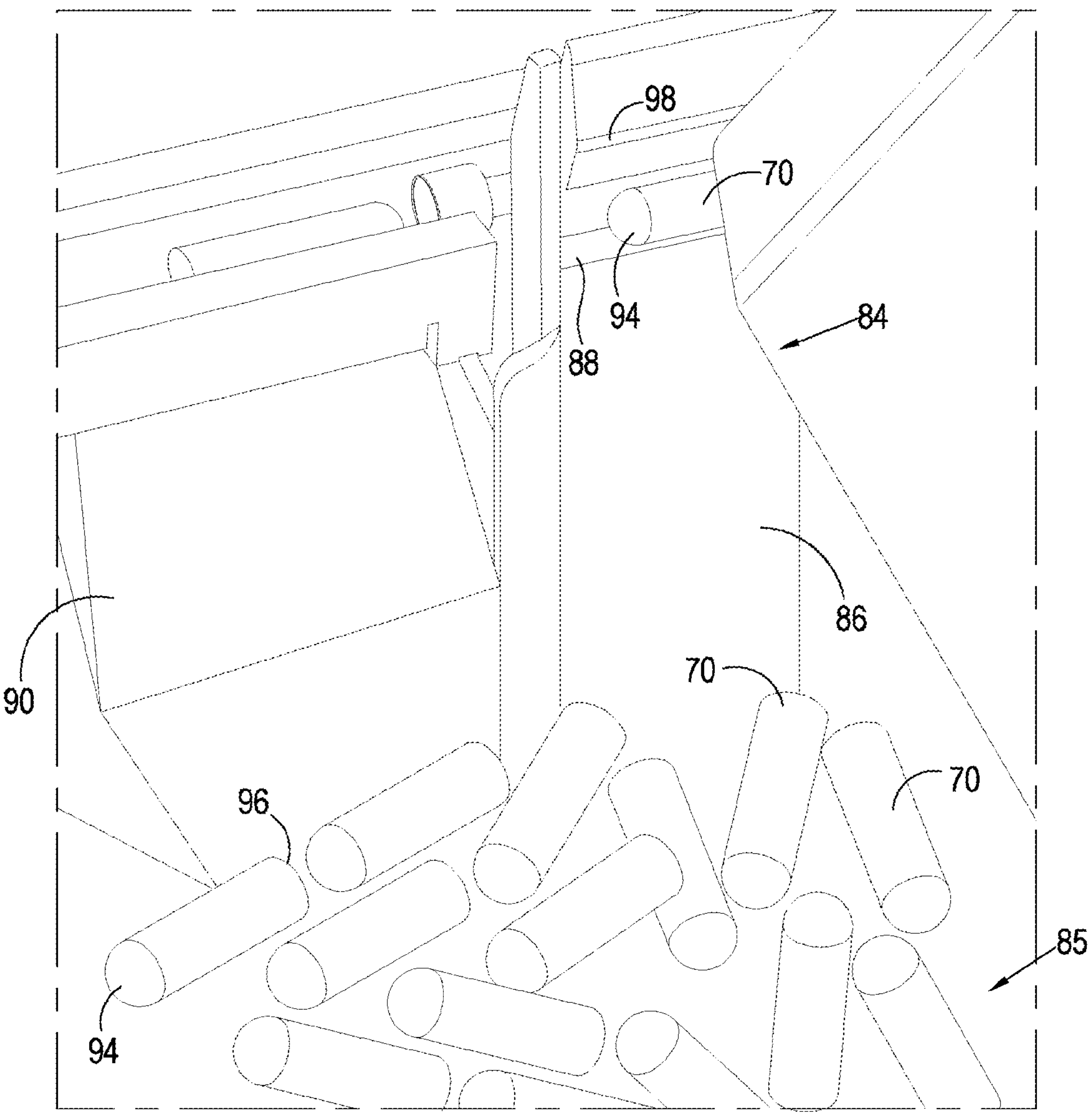
FIG. 8 shows part of a stud feed arrangement forming part of the machine of FIG. 1.

A plurality of spaced apart radially extending blind holes 16 open out of a radially outer surface of the tyre 14. The holes 16 are typically arranged in circumferentially spaced rows with each row extending generally parallel to a longitudinal axis 18 of the roller 11. As described below, the machine 10 is used to install studs 70 (best seen in FIGS. 8 to 10) in the holes 16. In this embodiment, each row is aligned with its adjacent row, however, other configurations may be used. For example, adjacent rows may be offset from each other (equally or unequally) such that alternate rows are aligned but adjacent rows are offset. Other configurations are also possible.

The machine 10 includes a support arrangement, generally indicated by reference numeral 20 for supporting the tyre 14 and shaft 12 for angular displacement about the longitudinal axis 18. The machine 10 further includes a stud insertion arrangement, generally indicated by reference numeral 22 (see FIG. 7), which is configured to insert studs into the holes 16 in the tyre 14 as part of the tyre manufacturing process.

Figure 6:
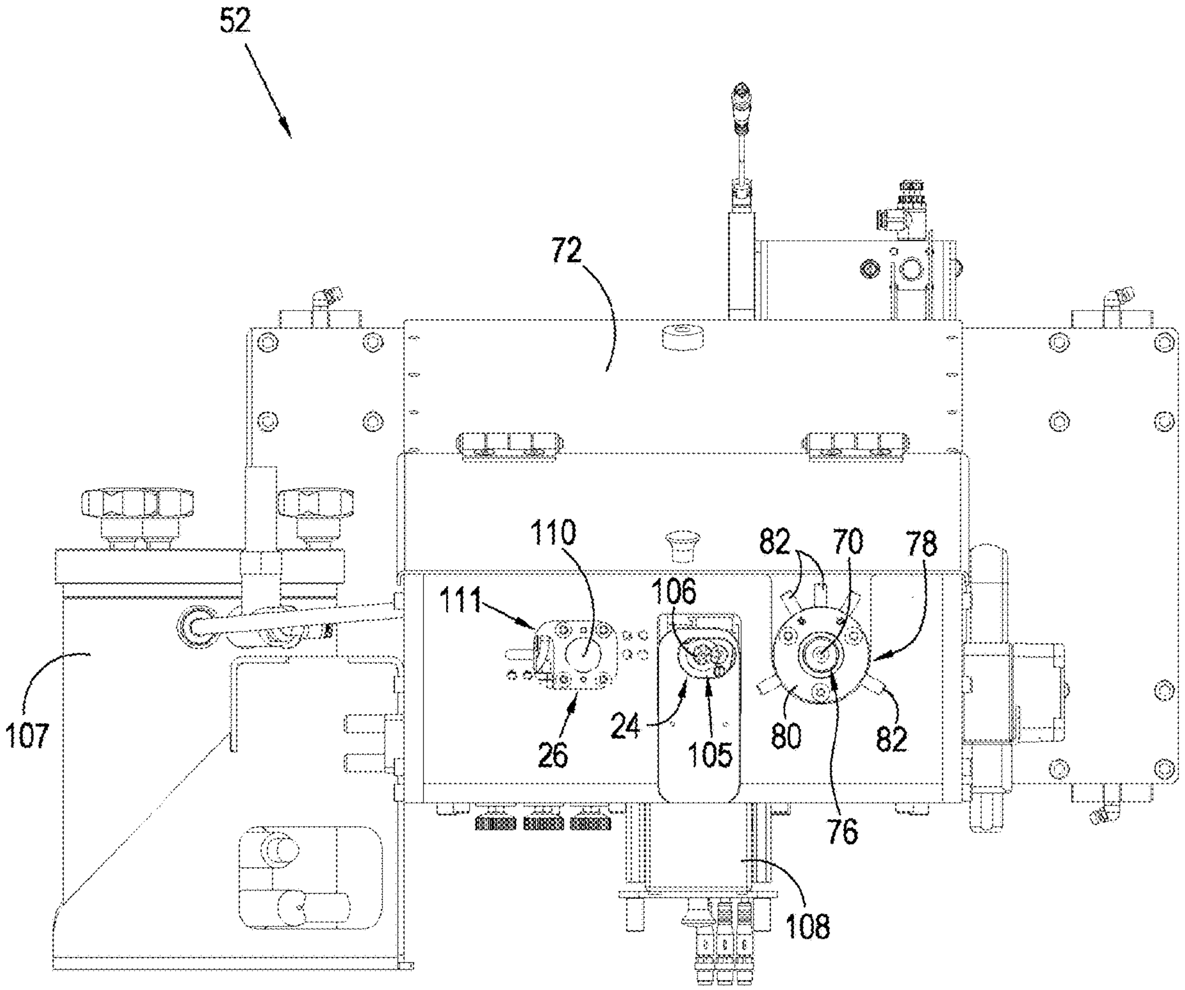
FIG. 6 shows a front view of a tool support module forming part of the machine of FIG. 1.
Figure 7:
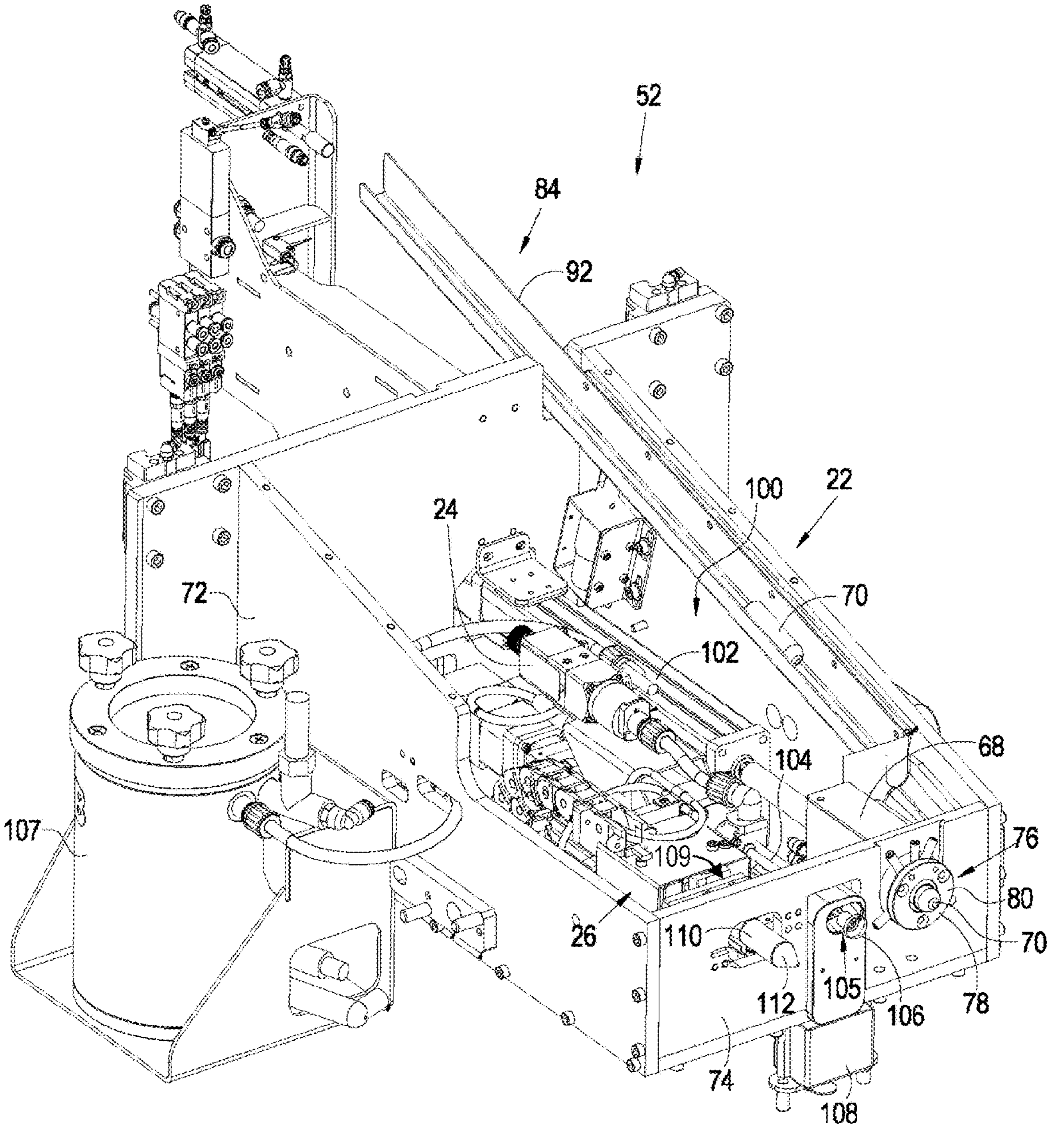
FIG. 7 shows a three-dimensional view of the tool support module of FIG. 6.

The stud installation machine 10 further includes an adhesive dispensing arrangement, generally indicated by reference numeral 24 (see FIGS. 6 and 7), and an indexing arrangement, generally indicated by reference numeral 26 (see FIG. 7).

The machine 10 includes a base, generally indicated by reference numeral 28. The base 28 includes a pair of parallel elongate longitudinally extending base members 30 and end members 32 which are connected to the ends of the base members 30.

The support arrangement 20 includes a first pair of rollers 34, 36 and a second pair of rollers 38, 40. Each pair of rollers (i.e. the first pair 34, 36 and the second pair 38, 40) supports one of the bearing mounting portions 12*c*, 12*d*, thereby supporting the HPGR roller 11 and allowing rotational movement thereof.

A first roller support structure 42 supports the rollers 34, 36 for rotation about parallel axes of rotation which are parallel with the longitudinal axis 18.

A second roller support structure 44 supports the rollers 38, 40 at a position which is longitudinally spaced from the first pair of rollers 34, 36 such that the rollers 38, 40 are rotatable about parallel axes which are parallel with the longitudinal axis 18.

The support structures 42, 44 are configured to permit the lateral spacing between the rollers 34, 36 and 38, 40 to be adjusted in order to support shafts 12 of different diameters. In addition, the second support structure 44 is longitudinally displaceable along the base members 30 in order to permit the longitudinal spacing between the first roller support structure 42 and second roller support structure 44 to be adjusted. Further, the second roller support structure 44 is supported on adjustable shims or jacks 46 to permit the level of the second pair of rollers 38, 40 to be adjusted to ensure that, in use, the longitudinal axis 18 extends horizontally.

The machine 10 includes a drive arrangement which comprises a pair of motors 48, 50 which are drivingly connected to the rollers 34, 36, respectively, to rotate the rollers 34, 36 and the shaft 12, in use, as described in more detail below.

Figure 5:
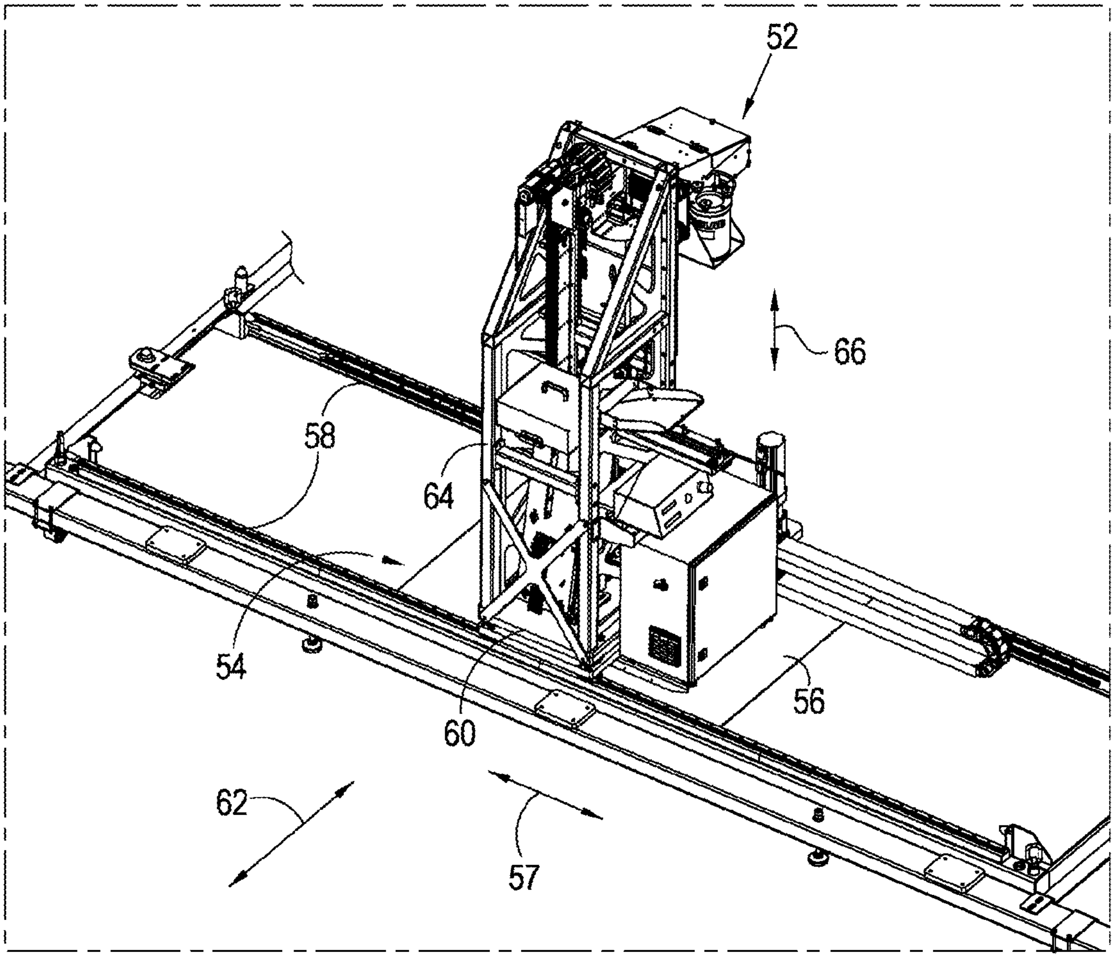
FIG. 5 shows an enlarged view of a gantry of the machine of FIG. 1.

The machine 10 includes a tool support module, generally indicated by reference numeral 52 (best seen in FIGS. 5 and 7) on which at least part of the stud insertion arrangement 22, adhesive dispensing arrangement 24 and indexing arrangement 26 are mounted.

The tool support module 52 is mounted on a gantry 54.

The gantry 54 includes a carriage 56 which is mounted for displacement in the direction of arrow 57 along a pair of parallel tracks 58 which extend horizontally and parallel with the longitudinal axis 18. The gantry 54 further includes an intermediate support 60 which is mounted on the carriage 56 and displaceable in a horizontal plane in the direction of arrow 62, i.e., perpendicular to the direction in which the carriage 56 is displaceable (best seen in FIG. 5). The gantry 54 further includes an upright support 64 which is mounted on the intermediate support 60. The tool support module 52 is mounted on the upright support 64 and is vertically displaceable thereon in the direction of arrow 66. Hence, the tool support module 52 is effectively displaceable about mutually perpendicular X, Y and Z axes.

With particular reference to FIGS. 6 and 7 of the drawings, the stud insertion arrangement 22 includes a stud support 68 which is configured to support a stud 70 in an insertion position in which the stud is radially spaced from and aligned with a radially extending stud receiving hole 16 in the tyre 14.

The tool support module 52 includes a hollow housing 72 having front face 74. The stud support 68 is mounted in the housing 72 in registration with a hole 76 in the front face 74. An adjustable stud guide 78 is mounted on the front face 74 and includes a support ring 80, which is in registration with the hole 76, and a plurality of circumferentially spaced radially extending adjustment screws 82 which protrude into a central opening defined by the ring 80. By adjusting the position of the adjustment screws 82 the effective size of the opening can be adjusted to suit the diameter of the studs 70 which are being installed.

The stud insertion arrangement 22 includes a feed arrangement, generally indicated by reference numeral 84, configured to feed studs 70 from a storage bin 85 to the stud support 68. As can best be seen in FIG. 8 of the drawings, the feed arrangement 84 includes a first stud lift 86 configured to pick up a stud 70 from the bin 85 and feed it to an intermediate platform 88. The feed arrangement 84 includes a second stud lift 90 which is configured to displace a stud from the intermediate platform 86 onto an upper end of a slide 92 along which the stud slides downwardly, under the influence of gravity, onto the stud support 68 in which it is in an insertion position ready to be inserted into a hole in the tyre.

Figure 9:
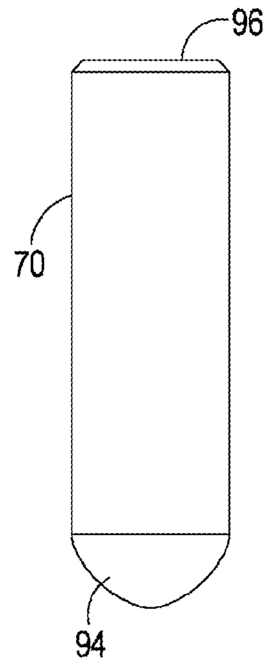
FIG. 9 shows a side view of a stud for installation in the machine of FIG. 1.
Figure 10:
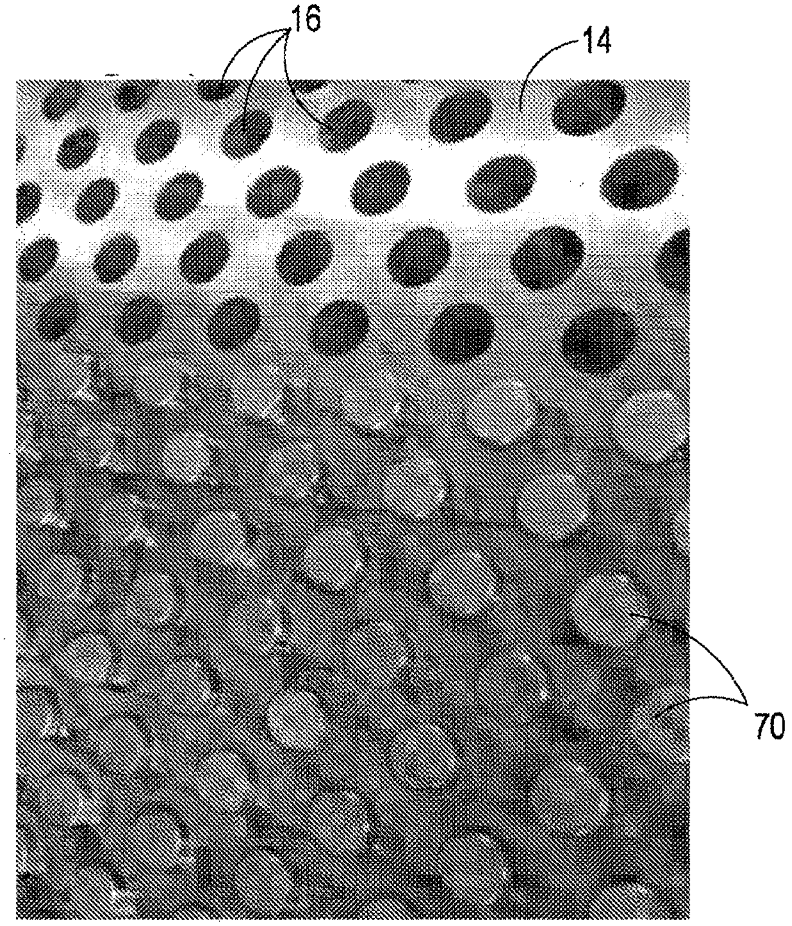
FIG. 10 shows a three-dimensional view of part of a tyre into which studs have been inserted.
Figure 11:
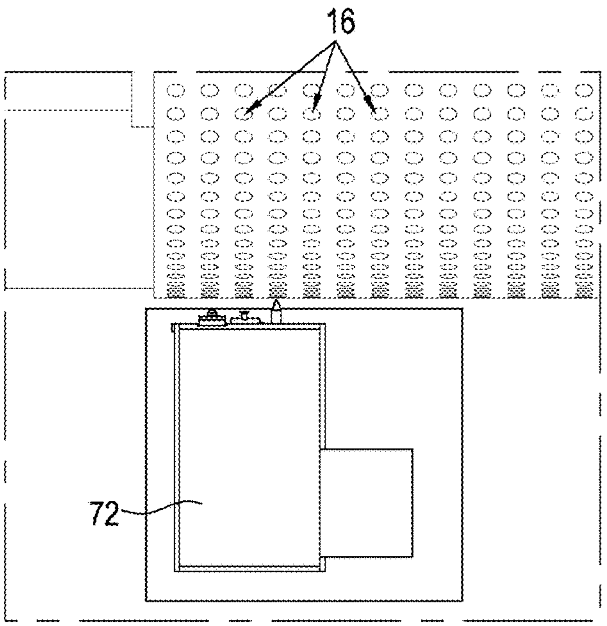
FIGS. 11 to 14 show sequentially the operation of the machine of FIG. 1 to insert studs into holes in a tyre of an HPGR.

As can be seen in FIG. 9 of the drawings, each stud 70 has an operatively inner end 94 which is domed or semi-hemispherical in shape and an operatively outer end 96.

The feed arrangement 84 includes a sensor 98, typically an optical sensor, which is positioned to sense the orientation of a stud on the intermediate platform 88. If the stud is in the correct orientation, i.e., whereby the operatively inner end 94 will be inserted into a hole in the tyre as described in more detail below, then the stud is displaced by means of the second lift 90 and discharged onto the slide 92. If, however, the sensor 98 determines that the stud is in the incorrect orientation, then the stud is discharged from the intermediate platform 88 back into the bin 85 and a fresh stud 70 is displaced from the bin 85 by means of the lift 86 onto the intermediate platform 88. Only when a stud 70 which is in the correct orientation is sensed is the stud displaced from the intermediate platform 88 via the second lift 90 and onto the slide 92.

The stud insertion arrangement 22 further includes a stud displacement mechanism, generally indicated by reference numeral 100 which comprises a pneumatically activated ram 102 which is displaceable between a retracted position, in which a stud is receivable on the stud support 68 and an insertion position or extended position in which the ram displaces the stud forwardly from the stud support through the hole 76 and ring 80 into a hole 16 in the tyre 14.

The adhesive dispensing arrangement 24 includes an extendable arm 104 which extends through a hole 105 in the front face 74 of the housing 72. A dispensing head 106 is mounted on a free or protruding end of the arm 104. The arm 104 is connected to a pressurised adhesive supply 107 and is configured to be displaced between a retracted position in which it is clear of the tyre 14 and an extended position in which the dispensing head 106 is inserted into a hole 16 in the tyre where adhesive can be dispensed from the dispensing head 106 onto the surface of the tyre defining the hole 16. A collection receptacle 108 is provided to collect any excess adhesive which may drip from the dispensing head 106.

The indexing arrangement 26 includes a sensor 109 (such as an inductive sensor) configured to sense the position of a hole 16 in the tyre 14 and a control system configured, if necessary, to adjust the position of the tool support module 52 (for example, in the direction of arrows 57 or 66) to align the stud guide 78 and adhesive dispensing arm 104 with holes 16 in the tyre 14 as described in more detail below.

The sensor 109 is coupled to a probe 110 which protrudes through a hole 111 in the front face 74 of the housing 72 and is displaceable between a rest or retracted position and an extended position. The probe 110 has a tapered leading end 112 and the sensor 109 includes one or more inductive sensors (such as inductive analogue proximity sensors) for detecting transverse (such as lateral) loads on the probe 110.

The machine 10 further includes a stud feed arrangement, generally indicated by reference numeral 114 configured to feed studs from a storage receptacle or hopper 115 into the bin 85.

In various HPGR rollers, the spacing between holes in a row may be different. In order to enable the machine 10 to be used with different sizes of tyres 14, the arm 104 and probe 110 are mounted in the housing such that they are laterally displaceable to permit the relative lateral spacing between the probe 110, arm 112 and stud support 68 to be adjusted to correspond to the pitch spacing between the holes in the particular tyre 14 into which the studs 70 are being inserted.

Figure 1:
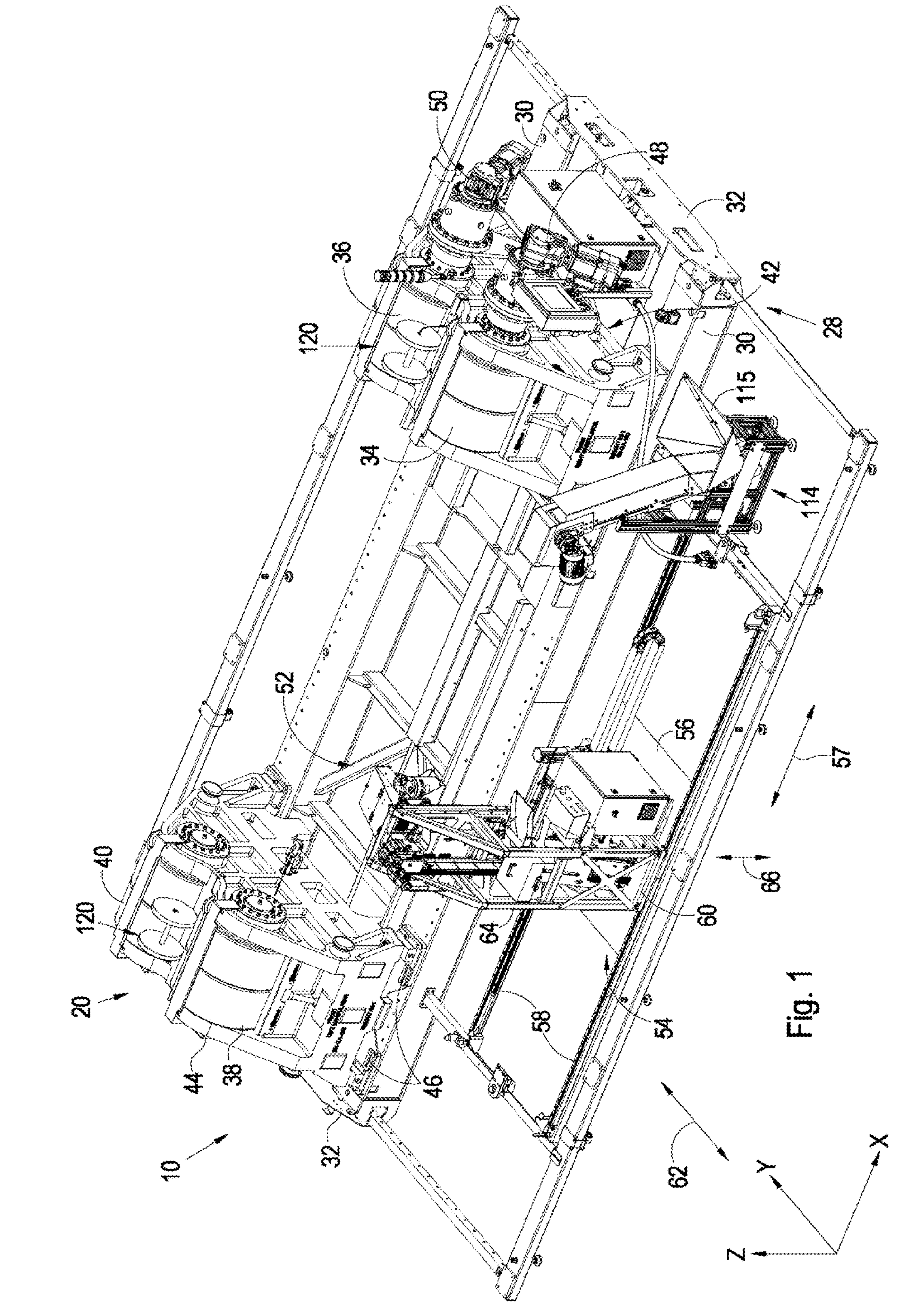
FIG. 1 shows a three-dimensional view of a stud installation machine, according to an embodiment of the invention, for installing studs in a tyre of an HPGR.

In use, the machine 10, when installed, is set up such that the rollers 34, 36, 38, 40 are positioned to support the shaft 12 with the longitudinal axis 18 extending horizontally. In this regard a laser alignment device, generally indicated by reference numeral 120 (FIG. 1), may be used.

With particular reference to FIGS. 11 to 14 of the drawings, the position of the housing 72 is adjusted such that the holes in the front face 74 through which the stud 70, arm 104 and probe 110 protrude are at the same height as the longitudinal axis 18 aligned with a row of holes 16 in the tyre 14. In addition, the housing 72 is positioned at a desired radial spacing from the radially outer surface of the tyre 14. With a stud 70 positioned on the stud support 68, the probe 110 is extended (FIG. 12) into a hole 16 in the tyre 14.

If the probe 110 is aligned with the hole 16, then it will not touch the sides of the hole 16 and no lateral forces will be applied to the probe 110 enabling it to move freely into and out of the hole 16. The spacing between the probe 110, arm 104 and stud guide 78 are selected to correspond to the pitch spacing between holes 16 in a row of holes 16. Accordingly, if the probe 110 is aligned with a hole 16, then so too will the arm 104 and stud guide 78 be aligned with other holes 16 in the row of holes 16.

If, however, the probe 110 is not completely aligned with a hole 16, by virtue of its tapered leading end 112, as it enters a hole 16, a transverse load will be applied to the probe 110. The sensor 109 is configured to determine the direction and extent of the displacement of the housing 72 which is required to bring the probe 110 into alignment with the hole 16 and therefore also to bring the arm 104 and stud guide 78 into alignment with adjacent holes 16 in the row. The sensor 109 communicates this direction and distance information to a controller (not shown) that moves the tool support module 52 accordingly so that the probe 110 is brought into alignment with the respective hole 16.

Figure 13:
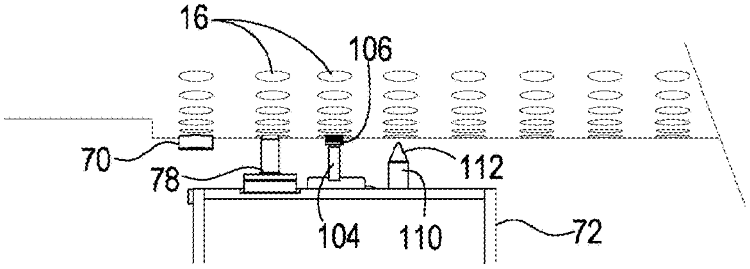

As illustrated in FIG. 13 of the drawings, once the displacement of the housing 72, if required, is complete, the arm 104 is extended such that the dispensing head 106 is positioned in the hole with which it is aligned where a predetermined volume of adhesive is dispensed in the hole onto the surface of the tyre defining the sides of the hole. At the same time, the ram 102 is extended in order to displace the stud 70 into a hole in which adhesive has already been dispensed thereby inserting the stud 70 into the hole such that the operatively inner end of the stud abuts against the root or inner end of the associated hole.

Figure 14:
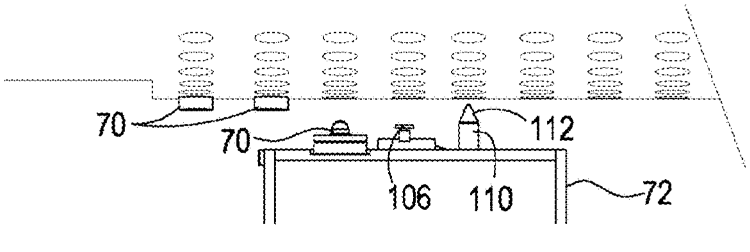
Figure 15:
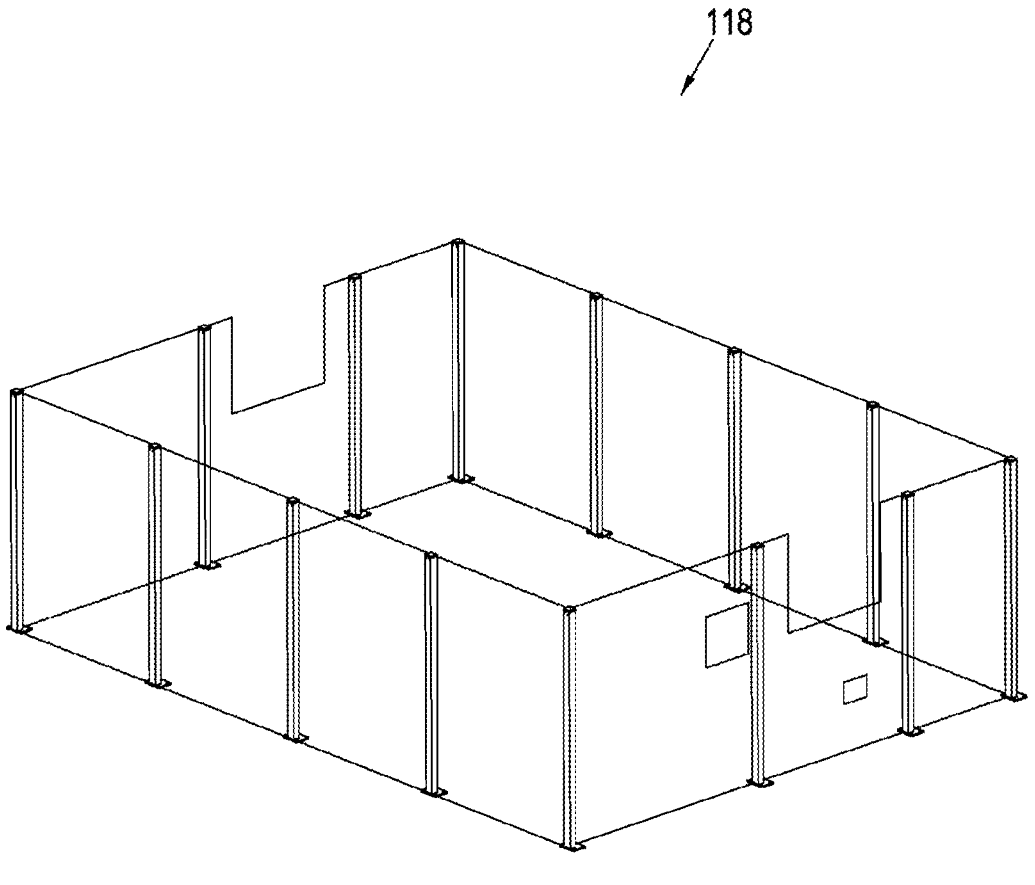
FIG. 15 shows a barrier arrangement which is used to prevent unauthorised access to the machine of FIG. 1.

Once the adhesive has been dispensed, the arm 104 is retracted. Further, once the stud has been inserted into the hole, the ram 102 is retracted and a fresh stud 70 is fed by means of the feed arrangement 84 onto the stud support 68. As illustrated in FIG. 14 of the drawings, the housing 72 is then displaced laterally such that the probe 110 is aligned with an adjacent hole in the row of holes and the process described above is repeated thereby dispensing adhesive and inserting a stud into each of the holes in the row.

Once a stud has been inserted into each hole in a row, the motors 48, 50 are activated to rotate the shaft 12 and tyre 14 by an amount sufficient to bring a subsequent (which may be an adjacent) row of holes into registration with the probe 110, arm 102 and stud guide 78 and the process described above is repeated to install studs 70 in each of the holes 16.

Figure 12:
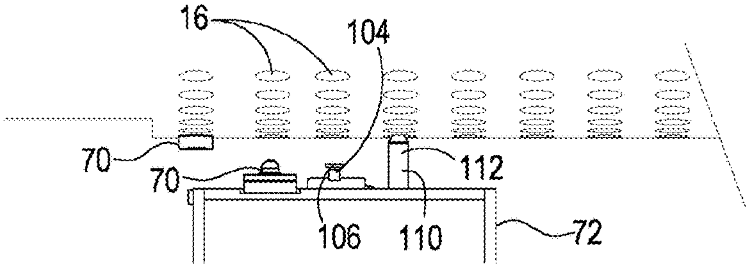

If desired, to inhibit unauthorised access to the stud installation machine 10, it may be enclosed within a barrier element or fence 118 as shown in FIG. 12 of the drawings.

A stud installation machine 10 in accordance with the above embodiment should greatly increase the speed with which studs 70 can be installed in the holes 16 in a tyre 14. In addition, the machine 10 will permit the studs 70 to be installed with greater consistency (due to the defined amount of force and adhesive used) thereby reducing the risk of an incorrectly installed stud 70.

Various modifications may be made to the above described embodiments within the scope of the present invention. For example sensor 109 may comprise a sensor other than an inductive sensor, for example, it may include a strain gauge.

LIST OF REFERENCE NUMERALS

Stud installation machine 10
HPGR roller 11
Shaft 12
Driven end 12*a*
Mounting end 12*b*
Bearing mounting portion 12*c*, 12*d*
Tyre mounting section 12*e*
Tyre 14
Blind holes 16
Longitudinal axis 18
Support arrangement 20
Stud insertion arrangement 22
Adhesive dispensing arrangement 24
Indexing arrangement 26
Base 28
Base members 30
End members 32
Rollers 34, 36, 38, 40
Roller support structure 42, 44
Adjustable shims 46
Motors 48, 50
Tool support module 52
Gantry 54
Carriage 56
Parallel tracks 58
Intermediate support 60
Arrow 57, 62, 66
Upright support 64
Stud support 68
Stud 70
Hollow housing 72
Front face 74
Hole 76
Adjustable stud guide 78
Support ring 80
Adjustment screws 82
Feed arrangement 84
Storage bin 85
Stud lift 86, 90
Platform 88
Slide 92
Stud inner end 94
Stud outer end 96
Sensor 98
Stud displacement mechanism 100
Ram 102
Extendable arm 104
Hole 105
Dispensing head 106
Adhesive supply 107
Receptacle 108
Sensor 109
Probe 110
Hole 111
Leading end 112
Stud feed arrangement 114
Hopper 115
Barrier arrangement 118
Laser alignment device 120

The invention claimed is:

1. A stud installation machine for installing studs in a tyre of an HPGR, which machine includes:

(i) a support arrangement configured to support a tyre and a shaft on which the tyre is mounted for angular displacement about a longitudinal axis of rotation;

(ii) a stud insertion arrangement, at least part of which is displaceable relative to a tyre supported on the support arrangement, and which is configured to insert studs into holes in the tyre; and (iii) further comprising an adhesive dispensing arrangement, at least part of which is displaceable relative to the tyre supported on the support arrangement, and which is configured to dispense adhesive into holes in the tyre before studs are inserted into the holes.

2. The stud installation machine of claim 1, in which the adhesive dispensing arrangement further comprises a dispensing head which is insertable into a hole in the tyre.

3. The stud installation machine of claim 2, in which the stud insertion arrangement further comprises a feed arrangement configured to feed the stud from a supply of studs into an insertion position in which the stud is radially spaced from and aligned with a radially extending stud receiving hole in the tyre of the roller into which the stud is to be inserted, and a stud displacement mechanism configured to displace the stud from the insertion position and insert at least an operatively inner end portion of the stud into the associated hole.

4. The stud installation machine of claim 3, in which the stud displacement mechanism further comprises a linear actuator which is displaceable between a retracted condition in which the stud is receivable in the insertion position and an extended condition, displacement of the linear actuator from its retracted condition to its extended condition displacing the stud from the insertion position into the hole in the tyre.

5. The stud installation machine of claim 1, further comprising an indexing arrangement configured to align the at least part of the dispensing arrangement and the at least part of the stud insertion arrangement with holes in the tyre to ensure accurate dispensing of the adhesive and placement of the studs.

6. The stud installation machine of claim 5, in which the indexing arrangement comprises a sensor which is configured to sense the position of a hole in the tyre and, if necessary adjust the position of the stud displacement mechanism to align it with the hole into which a stud is to be displaced.

7. The stud installation machine of claim 6, in which the sensor is coupled to a probe which has a tapered leading end which is insertable into the hole in the tyre and a detector arrangement for detecting lateral loading and/or displacement of the probe which would be indicative of a misalignment of the probe and hence the stud displacement mechanism relative to the holes in the tyre.

8. The stud installation machine of claim 7, in which the displacement mechanism, adhesive dispensing head and the probe are laterally spaced along a line, the spacing between which corresponding to the lateral spacing or pitch spacing of the holes in the row of holes in the tyre such that when the probe is aligned with a hole in a row of holes the displacement mechanism and the adhesive dispensing head are automatically aligned with other holes in the row of holes.

9. The stud installation machine of claim 6, further comprising a tool support module on which at least part of the stud insertion arrangement, adhesive dispensing arrangement and indexing arrangement are mounted and a gantry on which the tool support module is mounted, and which is configured to permit displacement of the tool support module relative to a tyre supported on the support arrangement.

10. The stud installation machine of claim 9, in which the gantry is configured to permit displacement of the tool support module at least one of longitudinally, parallel with the axis of rotation, vertically, and transversely relative to the axis of rotation.

11. The stud installation machine of claim 10, in which the gantry is configured to permit displacement of the tool support module along mutually perpendicular X, Y and Z axes.

12. The stud installation machine of claim 9, in which the gantry includes a carriage which is displaceable along a first horizontal displacement path which is parallel with the axis of rotation.

* * * * *